No. 606,908. Patented July 5, 1898.
H. F. ARNOLD.
PULLEY.
(Application filed Feb. 2, 1898.)
(No Model.)

WITNESSES
Charles V. Gooding.
Harry M. Ragg.

INVENTOR
Henry F. Arnold
by
Henry J. Miller
atty.

UNITED STATES PATENT OFFICE.

HENRY F. ARNOLD, OF HYDE PARK, MASSACHUSETTS, ASSIGNOR TO THE AMERICAN TOOL AND MACHINE COMPANY, OF BOSTON, MASSACHUSETTS.

PULLEY.

SPECIFICATION forming part of Letters Patent No. 606,908, dated July 5, 1898.

Application filed February 2, 1898. Serial No. 668,788. (No model.)

*To all whom it may concern:*

Be it known that I, HENRY F. ARNOLD, of Hyde Park, in the county of Norfolk and State of Massachusetts, have invented certain new and useful Improvements in Pulleys; and I hereby declare that the following is a full, clear, and exact description of the same, reference being had to the accompanying drawings, forming part of this specification.

This invention has reference to improvements in pulleys, and relates particularly to the hub portion thereof.

The object of the invention is to facilitate the distribution of lubricant to the parts of the hub forming the bearing.

The invention consists in the peculiar construction of the hub.

The invention also consists in such other novel features of construction and combination of parts as shall hereinafter be more fully described, and pointed out in the claims.

Figure 2:
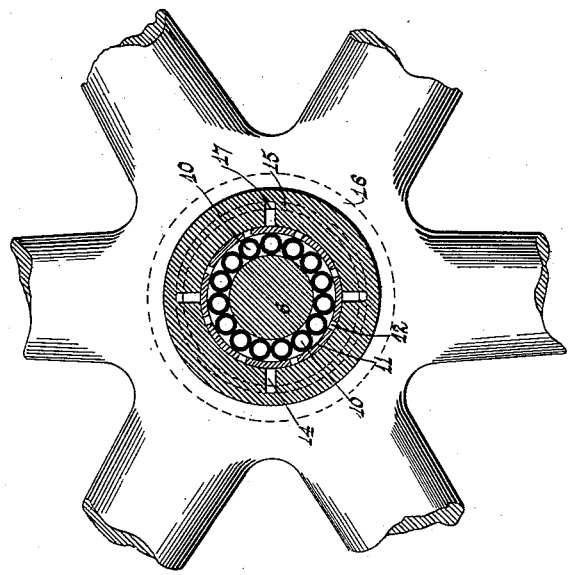
Figure 1:
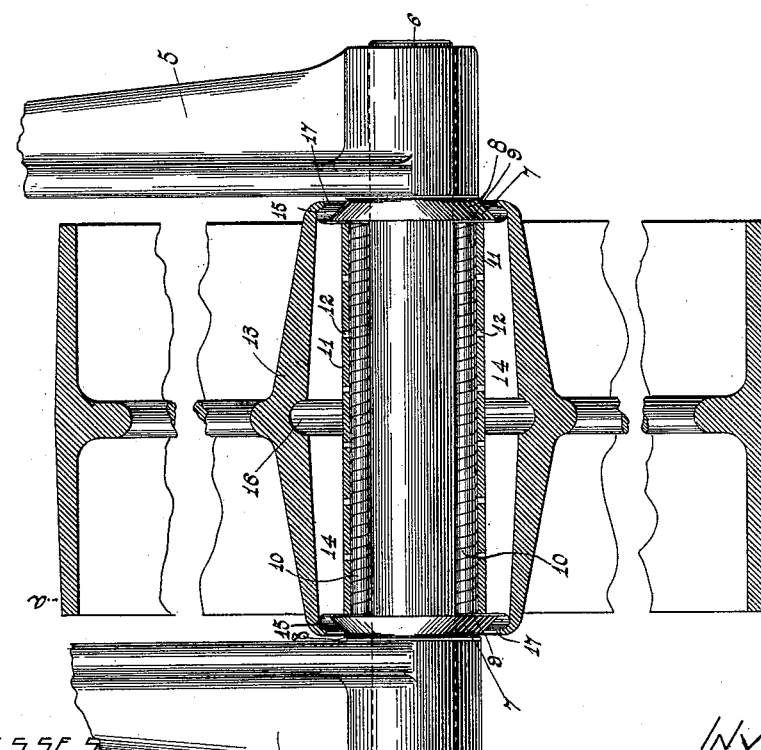

Figure 1 represents a vertical sectional view of the pulley, portions of the arms being broken away. Fig. 2 represents a cross-sectional view of the same, taken on line $a\ a$, Fig. 1.

Similar numbers of reference designate corresponding parts throughout.

In the drawings, 5 5 represent hangers or supports of any usual construction for the shaft 6, the pulley-hub and its antifriction lubricating bearing being journaled on the shaft 6 between the hangers.

Rotatable on the shaft 6 and bearing against the inner surface of the respective hangers are the collars 7 7, which have the annular grooves 8 8 and the conical peripheries, terminating in the drip edges 9 9.

Between the collars 7 7 is a series of antifriction-rolls 10 10, which bear on the shaft and are embraced by the cylindrical casing 11, having perforations 12 12 extending through its wall, this casing and the antifriction-rolls being held from lateral displacement by the inner faces of the collars 7 7.

Independently rotatable on the casing 11, as is the casing on the rolls, is the pulley-hub 13, the material of which is divided into segmental sections by the radial channels 14 14, which connect the annular end grooves 15 15 with the central annular groove 16, of considerably larger radius than that of the grooves 15 15, the bottoms of the channels inclining toward the groove 16 to facilitate the passage of lubricant toward the same and said groove 16 being recessed beyond the inner ends of the channels. The ends of the hub-segments bear against the inner faces of the collars 7 7, and the outer walls of the grooves 15 15 being formed by the lips 17 17, which embrace the collars 7 7.

Lubricant may be supplied to the bearing by introducing the same into the grooves 15 15 or in any usual manner. When the pulley is not under rotation, if fluid lubricant be introduced into the grooves 15 15 it will run down the lowermost channel 14 to the central grooves 16. If the pulley be now rotated, the centrifugal action will further tend to draw the lubricant toward the groove 16. When the rotation of the pulley is stopped, the lubricant will run down the surfaces of the uppermost channels 14 onto the surface of the casing 11 and, entering through the perforations 12 12, will pass to the antifriction-rolls and to the shaft. The tendency of the lubricant is to pass onto the casing before the end of the same is reached. Should any of the fluid pass the ends, it is diverted toward the shaft by the inner surfaces of the collars or passes into the upper portions of the grooves 15 15, and thence from the lips 17 17 onto the collars 7 7, following the grooves 8 to the under sides thereof, when it is directed by the shape of the collars toward this portion of the edge 9, then drips back into the lower portions of the grooves 15 15, and passes through the lowermost channels 14 to the groove 16.

It will thus be seen that by this construction great economy is effected in the use of lubricant, none being thrown outward at the ends of the hub, while the independence of action between the shaft, the antifriction-rolls, the casing, and the hub is of great importance in reducing the frictional contact, particularly when combined with the loose collars 7 7.

Having thus described my invention, I claim as new and desire to secure by Letters Patent—

1. A pulley comprising a hub having radial channels extending from the bore thereof, grooves at the ends of the hub connecting said channels, a central groove recessed beyond the bottoms of the channels, drip-collars partially contained within the end grooves, and a perforated sleeve or casing loosely fitting the bore of the hub.

2. The combination with suitable supports and a shaft therein of the collars 7 7 loose on the shaft, the rolls 10 arranged around the shaft, the perforated casing 11 embracing the rolls, and the hub 13 having the channels 14 14 the grooves 15 15 and 16, and the lips 17 17 rotatably mounted on the casing, as described.

HENRY F. ARNOLD.

Witnesses:
R. F. MERRILL,
CHAS. A. TOWLE.